(12) United States Patent
Albelo et al.

(10) Patent No.: US 9,221,124 B2
(45) Date of Patent: Dec. 29, 2015

(54) ULTRASHORT LASER PULSE WAFER SCRIBING

(71) Applicant: ELECTRO SCIENTIFIC INDUSTRIES, INC., Portland, OR (US)

(72) Inventors: Jeffrey A. Albelo, Portland, OR (US); Peter Pirogovsky, Portland, OR (US)

(73) Assignee: ELECTRO SCIENTIFIC INDUSTRIES, INC., Portland, OR (US)

( * ) Notice: Subject to any disclaimer, the term of this patent is extended or adjusted under 35 U.S.C. 154(b) by 0 days.

(21) Appl. No.: 14/098,229

(22) Filed: Dec. 5, 2013

(65) Prior Publication Data

US 2014/0091069 A1    Apr. 3, 2014

Related U.S. Application Data

(63) Continuation of application No. 11/440,792, filed on May 25, 2006, now Pat. No. 8,624,157.

(51) Int. Cl.
*B23K 26/36* (2014.01)
*B23K 26/06* (2014.01)
(Continued)

(52) U.S. Cl.
CPC ........... *B23K 26/367* (2013.01); *B23K 26/0635* (2013.01); *B23K 26/383* (2013.01);
(Continued)

(58) Field of Classification Search
CPC ............. B23K 26/0635; B23K 26/367; B23K 26/4075
USPC ........... 219/121.71, 121.69, 121.61; 438/460, 438/461, 462, 465
See application file for complete search history.

(56) References Cited

U.S. PATENT DOCUMENTS

| 5,593,606 A | 1/1997 | Owen et al. |
| 5,632,083 A | 5/1997 | Tada et al. |

(Continued)

FOREIGN PATENT DOCUMENTS

| DE | 3705550 A1 | 1/1988 |
| EP | 01433195 A2 | 6/2004 |

(Continued)

OTHER PUBLICATIONS

Bovastek, James M., et al., "Ultrashort pulse micromaching with the 10-μJ FCPA fiber laser," Fiber Laser III: Technology, Systems, and Applications, Proc. of SP:IE vol. 6102, pp. 610201-1-610201-11, 2006.

(Continued)

*Primary Examiner* — Thien S Tran
(74) *Attorney, Agent, or Firm* — Stoel Rives LLP

(57) ABSTRACT

Systems and methods are provided for scribing wafers with short laser pulses so as to reduce the ablation threshold of target material. In a stack of material layers, a minimum laser ablation threshold based on laser pulse width is determined for each of the layers. The highest of the minimum laser ablation thresholds is selected and a beam of one or more laser pulses is generated having a fluence in a range between the selected laser ablation threshold and approximately ten times the selected laser ablation threshold. In one embodiment, a laser pulse width in a range of approximately 0.1 picosecond to approximately 1000 picoseconds is used. In addition, or in other embodiments, a high pulse repetition frequency is selected to increase the scribing speed. In one embodiment, the pulse repetition frequency is in a range between approximately 100 kHz and approximately 100 MHz.

19 Claims, 9 Drawing Sheets

(51) Int. Cl.
*B23K 26/38* (2014.01)
*B23K 26/40* (2014.01)

(52) U.S. Cl.
CPC ............. *B23K26/385* (2013.01); *B23K 26/386* (2013.01); *B23K 26/4075* (2013.01); *B23K 2201/40* (2013.01)

(56) References Cited

U.S. PATENT DOCUMENTS

| | | | |
|---|---|---|---|
| 5,656,186 A | 8/1997 | Mourou et al. | |
| 5,731,047 A | 3/1998 | Noddin | |
| 5,864,430 A * | 1/1999 | Dickey et al. | 359/559 |
| 6,341,029 B1 | 1/2002 | Fillion et al. | |
| 6,420,245 B1 | 7/2002 | Manor | |
| 6,433,301 B1 | 8/2002 | Dunsky et al. | |
| 6,472,295 B1 | 10/2002 | Morris et al. | |
| 6,555,447 B2 | 4/2003 | Weishauss et al. | |
| 6,562,698 B2 | 5/2003 | Manor | |
| 6,664,498 B2 | 12/2003 | Forsman et al. | |
| 6,676,878 B2 * | 1/2004 | O'Brien et al. | 264/400 |
| 6,791,060 B2 | 9/2004 | Dunsky et al. | |
| RE39,001 E | 3/2006 | Lundquist et al. | |
| 7,423,237 B2 | 9/2008 | Kusama et al. | |
| 7,528,342 B2 | 5/2009 | Deshi | |
| 8,624,157 B2 | 1/2014 | Albelo | |
| 2001/0054606 A1 | 12/2001 | Weishauss et al. | |
| 2002/0033558 A1 | 3/2002 | Fahey et al. | |
| 2002/0063361 A1 | 5/2002 | Fahey | |
| 2002/0149136 A1 | 10/2002 | Baird et al. | |
| 2002/0158052 A1 * | 10/2002 | Ehrmann et al. | 219/121.69 |
| 2003/0092267 A1 | 5/2003 | Kian et al. | |
| 2003/0183603 A1 | 10/2003 | Forsman et al. | |
| 2005/0017156 A1 | 1/2005 | Ehrmann et al. | |
| 2005/0074974 A1 * | 4/2005 | Stoltz | 438/690 |
| 2005/0087522 A1 * | 4/2005 | Sun et al. | 219/121.71 |
| 2005/0155954 A1 * | 7/2005 | Oba et al. | 219/121.67 |
| 2005/0155956 A1 * | 7/2005 | Hamada et al. | 219/121.69 |
| 2005/0274702 A1 | 12/2005 | Deshi | |
| 2006/0035411 A1 * | 2/2006 | Oba et al. | 438/113 |
| 2006/0039419 A1 | 2/2006 | Deshi | |
| 2006/0169677 A1 * | 8/2006 | Deshi | 219/121.7 |

FOREIGN PATENT DOCUMENTS

| | | | |
|---|---|---|---|
| EP | 1589579 A2 | 10/2005 | |
| GB | 2405369 A | 2/2005 | |
| JP | 2002172481 A * | 6/2002 | ............ B23K 26/06 |
| JP | 2002205179 A | 7/2002 | |
| JP | 2002530206 A | 9/2002 | |
| JP | 2005072174 A | 3/2005 | |
| JP | 2005074485 A | 3/2005 | |
| JP | 2005179154 A | 7/2005 | |
| JP | 2005212473 A | 11/2005 | |
| JP | 2005310771 A | 11/2005 | |
| TW | 200520080 | 6/2005 | |
| WO | 9527587 A1 | 10/1995 | |
| WO | 0030801 A1 | 6/2000 | |
| WO | 0073770 A1 | 12/2000 | |
| WO | 0117001 A1 | 3/2001 | |
| WO | 03002289 A1 | 1/2003 | |
| WO | 2005042421 A1 | 12/2005 | |

OTHER PUBLICATIONS

Du, D. et al., "Laser-induced breakdown by impact ionization in SiO2 with pulse widths from 7 ns to 150 fs," Appl. Phys. Lett., vol. 64, No. 23, Jun. 6, 1994, pp. 3071-3073, American Institute of Physics.

Ostendorf, A., et al., "Ablation of meals and semiconductors with ultrashort-pulsed lasers: improving surface qualifies of microcuts and grooves," Commercial and Biomedical Applications of Ultrafast Lasers IV, Proc. of SPI vol. 5340, pp. 153-163, Bellingham, Washington, 2004.

* cited by examiner 610  610

ULTRASHORT LASER PULSE WAFER SCRIBING

RELATED APPLICATION

This application is a continuation of U.S. patent application Ser. No. 11/440,792, filed May 25, 2006, which is hereby incorporated by reference herein in its entirety.

TECHNICAL FIELD

This application relates to laser cutting or scribing and, in particular, to a method of manufacturing integrated circuitry using ultrashort laser pulses at a high repetition rate to ablate material.

BACKGROUND INFORMATION

Integrated circuits (ICs) are generally fabricated in an array on or in a semiconductor substrate. ICs generally include several layers formed over the substrate. One or more of the layers may be removed along scribing lanes or streets using a mechanical saw or a laser. After scribing, the substrate may be throughcut, sometimes called diced, using a saw or laser to separate the circuit components from one another.

Semiconductor manufacturers have been shrinking transistor sizes in ICs to improve chip performance. This has resulted in increased speed and device density. To facilitate further improvements, semiconductor manufacturers use materials to reduce the capacitance of dielectric layers. For example, to form a finer circuit pattern, a semiconductor wafer having a low dielectric constant (low-k) insulating film is laminated on the surface of the semiconductor substrate. Low-k dielectrics may include, for example, an inorganic material such as SiOF or SiOB or an organic material such as polyimide-based or parylene-based polymer.

However, conventional mechanical and laser cutting methods are not well suited for scribing many advanced finished wafers with, for example, low-K dielectric materials. Relatively low density, lack of mechanical strength and sensitivity to thermal stress make low-k dielectric material very sensitive to stress. Conventional mechanical wafer dicing and scribing techniques are known to cause chips, cracks and other types of defects in low-k materials, thus damaging the IC devices. To reduce these problems, cutting speeds are reduced. However, this severely reduces throughput.

Further, known laser techniques can produce excessive heat and debris. Traditionally, laser pulse widths in the tens of nanoseconds or more have been used for semiconductor cutting or scribing. However, these long pulse widths allow excessive heat diffusion that causes heat affected zones, recast oxide layers, excessive debris and other problems. For example, FIG. 1 is a side view schematic of a semiconductor material 100 diced using a conventional laser cutting technique. Near a cut area 102, a heat affected zone 104 and recast oxide layer 106 has formed. Cracks may form in the heat affected zone 104 and reduce the die break strength of the semiconductor material 100. Thus, reliability and yield are reduced. Further, debris 108 from the cut area 102 is scattered across the surface of the semiconductor material 100 and may, for example, contaminate bond pads.

In addition, conventional laser cutting profiles may suffer from trench backfill of laser ejected material. When the wafer thickness is increased, this backfill becomes more severe and reduces dicing speed. Further, for some materials under many process conditions, the ejected backfill material may be more difficult to remove on subsequent passes than the original target material. Thus, cuts of low quality are created that can damage IC devices and require additional cleaning and/or wide separation of the devices on the substrate.

A method for laser cutting or scribing that increases throughput and improves cut surface or kerf quality is, therefore, desirable.

SUMMARY OF THE DISCLOSURE

The embodiments disclosed herein provide systems and methods of scribing a finished wafer that includes low-k dielectric and/or other materials as fast as or faster than existing mechanical and/or laser methods. However, the laser scribing is performed with reduced or no mechanical and/or thermal stress and with reduced or no debris. Thus, little or no post process cleaning is required. Further, clean, straight edge cuts are produced with no additional lateral separation of the devices on wafer required to accommodate the scribing process.

In one embodiment, a method of cutting a plurality of layers formed over a substrate is provided. Each of the plurality of layers has a respective laser ablation threshold that varies with laser pulse width. The method includes determining a minimum laser ablation threshold for each of the plurality of layers and selecting the highest of the minimum laser ablation thresholds. The method also includes generating a beam of one or more laser pulses having a fluence in a range between the selected laser ablation threshold and approximately ten times the selected laser ablation threshold, and scribing a kerf between a plurality of integrated circuits formed in the plurality of layers. The kerf passes through the plurality of layers to a top surface of the substrate.

In certain such embodiments, the laser pulses have a pulse width in a range between approximately 0.1 picosecond and approximately 1000 picoseconds. Further, the beam has a pulse repetition rate in a range between approximately 100 kHz and approximately 100 MHz and can cut through approximately 10 µm of material at a speed in a range between approximately 200 mm/second and approximately 1000 mm/second. In addition, or in other embodiments, the energy per pulse is in a range between approximately 1 µJ and approximately 100 µJ.

In another embodiment, a method is provided for scribing a wafer having a plurality of integrated circuits formed thereon or therein. The integrated circuits are separated by one or more streets. The method includes generating a beam of one or more laser pulses. The laser pulses have a pulse width selected so as to minimize an ablation threshold of a target material. The method further includes ablating a portion of the target material with the beam at a pulse repetition frequency in a range between approximately 5.1 MHz and approximately 100 MHz.

In another embodiment, a method is provided including generating a beam of one or more laser pulses that have a pulse width in a range between approximately 0.6 picosecond and approximately 190 picoseconds. The method further includes ablating a portion of the target material with the beam.

In another embodiment, a method is provided including generating a beam of one or more laser pulses that have a pulse width in a range between approximately 210 picoseconds and approximately 1000 picoseconds. The method further includes ablating a portion of the target material with the beam.

Additional aspects and advantages will be apparent from the following detailed description of preferred embodiments, which proceeds with reference to the accompanying drawings.

DETAILED DESCRIPTION OF PREFERRED EMBODIMENTS

Figure 1:
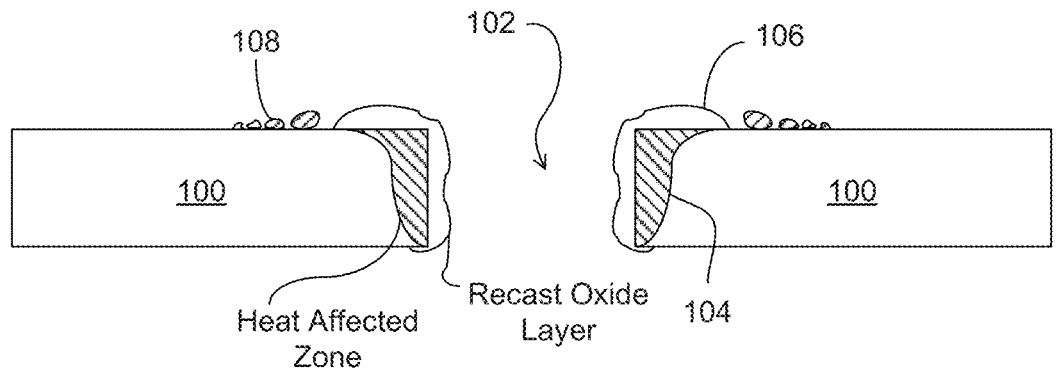
FIG. 1 is a side view schematic of a semiconductor material diced using a conventional laser cutting technique.

The ability of a material to absorb laser energy determines the depth to which that energy can perform ablation. Ablation depth is determined by the absorption depth of the material and the heat of vaporization of the material. Parameters such as wavelength, pulse width duration, pulse repetition frequency, and beam quality can be controlled to improve cutting speed and the quality of the cut surface or kerf. In one embodiment, one or more of these parameters are selected so as to provide a substantially low fluence (typically measured in $J/cm^2$) that has just enough energy to ablate the target material. Thus, the amount of excessive energy deposited into the material is reduced or eliminated. Using a lower fluence reduces or eliminates recast oxide layers, heat affected zones, chipping, cracking, and debris. Thus, die break strength is increased and the amount of post-laser cleaning required is decreased.

U.S. Pat. No. 5,656,186 to Mourou et al. teaches that the ablation threshold of a material is a function of laser pulse width. As used herein, "ablation threshold" is a broad term that includes its ordinary and customary meaning, and includes, for example, a sufficient fluence required to remove material for scribing or cutting. Traditional pulse widths in the nanosecond range generally require a higher ablation threshold as compared to that of shorter pulse widths. Shorter pulses increase peak power and reduce thermal conduction. To increase spatial resolution, the Mourou et al. patent teaches using pulse widths in the femtosecond range. However, femtosecond laser pulse widths remove smaller amounts of material per pulse as compared to traditional nanosecond pulses. Thus, the amount of time required to cut or scribe a line is increased and throughput is reduced. Further, in the femtosecond pulse range, the ablation threshold may increase as the femtosecond pulses become shorter.

Thus, in one embodiment disclosed herein, pulse widths are selected in the picosecond range to lower the ablation threshold while removing more material per pulse than femtosecond pulses. In the picosecond range, the time constant for electrons initially excited by the laser pulse to exchange energy with the bulk of material (e.g., electron thermalization with consecutive electron-lattice interaction) is in the picosecond range. For example, the time constant may be on the order of approximately 1 to 10 picoseconds. Thus, it is thought that pulses of shorter or comparable duration result in "cold" Coulomb type ablation without significant heating. Accordingly, thermal stressing and/or melting of the material is eliminated or reduced.

Artisans will recognize from the disclosure herein that pulses in the range between approximately 1 picosecond and approximately 10 picoseconds may provide some thermal type ablation. However, using relatively low fluence per pulse that is only slightly above the ablation threshold reduces excessive energy that produces melted debris. Thus, cleaner kerfs are produced. Further, the heat effects are generally limited to the laser spot because the pulse widths are too short for heat to diffuse or propagate outside the irradiated area. However, when the pulse becomes too short, the effective depth of the laser light interaction with the material is shortened and the efficiency of the ablation is reduced (e.g., less electrons are initially excited by the laser pulse).

To increase cutting speed in certain embodiments, the pulse repetition frequency is selected so as to provide cutting speeds of conventional saw or laser semiconductor cutting processes. High pulse repetition frequencies are used to ablate material quicker. Further, high pulse repetition frequencies allow more energy to be used for ablation before it is dissipated in the surrounding materials.

As discussed in detail below, beam shaping is used in certain embodiments to improve kerf quality. Laser beams can be shaped to create, for example, a substantially flat kerf bottom that generates less debris and reduces or eliminates damage to the substrate. In addition to an improved sidewall profile, beam shaping also reduces the width of the recast oxide layer.

For convenience, the term cutting may be used generically to include scribing (cutting that does not penetrate the full depth of a target work piece) and throughcutting, which includes slicing (often associated with wafer row separation) or dicing (often associated with part singulation from wafer rows). Slicing and dicing may be used interchangeably in the context of this disclosure.

Reference is now made to the figures in which like reference numerals refer to like elements. For clarity, the first digit of a reference numeral indicates the figure number in which the corresponding element is first used. In the following description, numerous specific details are provided for a thorough understanding of the embodiments disclosed herein. However, those skilled in the art will recognize that the invention can be practiced without one or more of the specific details, or with other methods, components, or materials. Further, in some cases, well-known structures, materials, or operations are not shown or described in detail in order to avoid obscuring aspects of the invention. Furthermore, the described features, structures, or characteristics may be combined in any suitable manner in one or more embodiments.

Figure 2A:
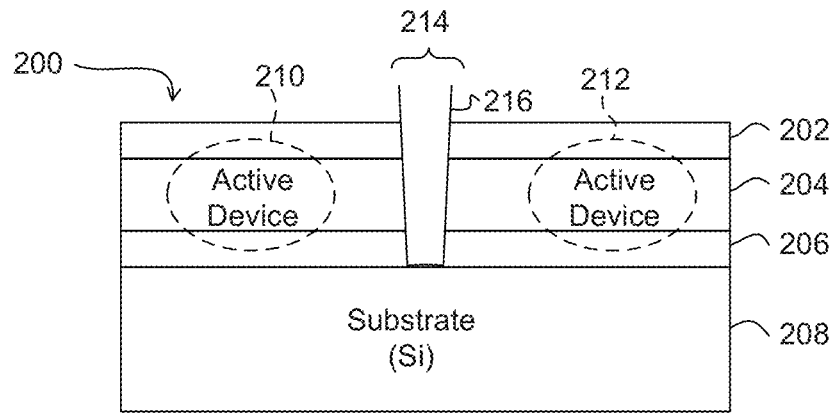
FIGS. 2A-2C are side view schematics of an exemplary work piece that is cut according to certain embodiments of the invention.
Figure 2B:
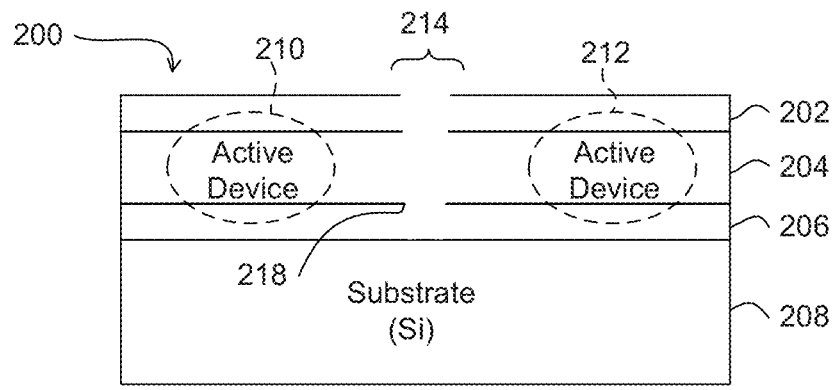
Figure 2C:
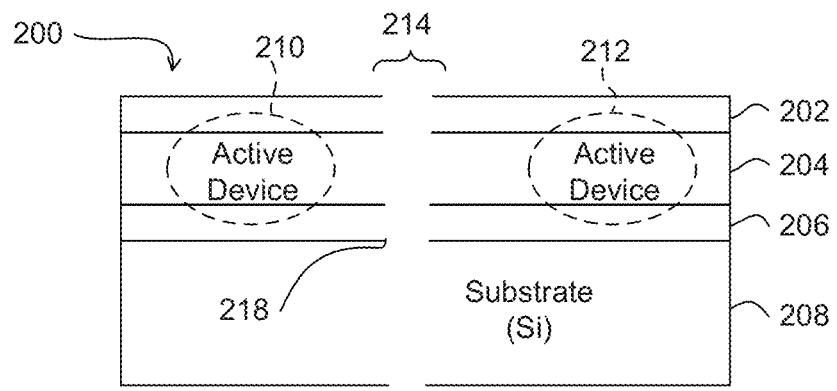

FIGS. 2A-2C are side view schematics of an exemplary work piece 200 that is cut according to certain embodiments of the invention. The work piece 200 includes layers 202, 204, 206 formed over a substrate 208. As an artisan will recognize, the layers 202, 204, 206 may include interconnect layers separated by insulation layers, including low-k dielectrics, to form electronic circuitry. For example, the layers 202, 204, 206 may include materials such as Cu, Al, $SiO_2$, SiN, fluor-silicated glass (FSG), organosilicated glass (OSG), SiOC, SiOCN, and other materials used in IC manufacture. For illustrative purposes, three layers 202, 204, 206 are shown in FIGS. 2A-2C. However, an artisan will recognize that more layers or fewer layers can be used for particular ICs. As shown, the substrate 208 comprises Si. However, an artisan will also recognize that other materials useful in IC manufacture can be used for the substrate 208 including, for example, glasses, polymers, metals, composites, and other materials. For example, the substrate 208 may include FR4.

Electronic circuitry is formed in active device areas 210, 212 that are separated from each other by scribing lanes or streets 214. An artisan will recognize that test structures are often formed in and around the streets 214. To create individual ICs, the work piece 200 is scribed, throughcut, or both, along the streets 214. In FIG. 2A, a laser beam 216 according to one embodiment is shown scribing the work piece 200 by ablating the layers 202, 204, 206 in the area of the street 214. As shown in FIG. 2B, the result of the laser scribing process is a laser kerf 218 that passes from the top surface of the top layer 202 through the layers 202, 204, 206 to the top surface of the substrate 208. As discussed below, in certain embodiments, the laser beam 216 is shaped so as to increase the quality of the kerf's sidewall profile and reduce or prevent damage to the substrate 208.

The laser beam 216 comprises a series of laser pulses configured to provide the lowest possible fluence to the work piece 200 that still provides a desired material ablation of the layers 202, 204, 206 and/or the substrate 208. In one embodiment, the fluence of the laser beam 216 is selected so as to be in a range between the ablation threshold of the work piece 200 and approximately ten times the ablation threshold of the work piece 200. In another embodiment, the fluence of the laser beam 216 is selected so as to be in a range between the ablation threshold of the work piece 200 and approximately five times the ablation threshold of the work piece 200.

To lower the ablation threshold, according to one embodiment, the pulse width is set in a range between approximately 0.1 picosecond and approximately 1000 picoseconds. In other embodiments, the pulse width is set in a range between approximately 1 picosecond and approximately 10 picoseconds. In other embodiments, the pulse width is set in a range between 10 picoseconds and 40 picoseconds. However, an artisan will recognize from the disclosure herein that other pulse widths can be used. For example, in one embodiment, the pulse width is in a range between approximately 0.6 picosecond and approximately 190 picoseconds, while in another embodiment, the pulse width is in a range between approximately 210 picoseconds and 1000 picoseconds.

In one embodiment, the laser beam 216 is generated using an average power in a range between approximately 10 W and approximately 50 W and an energy per pulse between approximately 1 µJ and approximately 100 µJ. When the layers 202, 204, 206 have a combined thickness in a range between approximately 8 µm and approximately 12 µm, the laser beam 216 is configured to cut through the layers 202, 204, 206 at a rate in a range between approximately 200 mm/second and approximately 1000 mm/second using high pulse repetition frequencies.

In certain embodiments, the separation between pulses is in a range between approximately 1 nanosecond and approximately 10 nanoseconds to allow substantially complete heat dissipation. In other embodiments, the separation between pulses is in a range between approximately 10 nanoseconds and approximately 1 microseconds to allow the plume of ablated material in a first pulse to spread to a sufficiently low density so as to not significantly interact with a subsequent pulse. In certain such embodiments, the pulse repetition frequency is in a range between approximately 1 MHz and approximately 100 MHz. In other embodiments, the pulse repetition frequency is in a range between approximately 5.1 MHz and approximately 100 MHz. In another embodiment, the pulse repetition frequency is in a range between approximately 50 kHz and approximately 4 MHz.

At high pulse repetition frequencies (e.g., above approximately 1 MHz and, more particularly, above approximately 10 MHz), residual pulse energy may accumulate in the form of heat because deposited energy does not have sufficient time to dissipate between pulses. The cumulative effects generally increase ablation efficiency and may also increase melting. However, the melting is generally limited to the irradiated area and may be concentrated in the center of the kerf. Depending on the particular application, increased melting in the center of the kerf may increase or decrease the desired quality of the kerf.

In an exemplary embodiment, the laser beam 216 is generated using a Duetto™ laser available from Time-Bandwidth Products of Zurich, Switzerland. The Duetto™ laser has a wavelength of approximately 1064 nm, a pulse repetition frequency in a range between approximately 50 kHz and approximately 4 MHz, an average power of approximately 10 W or more, a peak power of up to approximately 16 MW, an energy per pulse of up to approximately 200 µJ, and a pulse width of up to approximately 12 picoseconds. Alternatively, in another exemplary embodiment, the laser beam 216 is generated using a "RAPID" picosecond laser available from Lumera-Laser GmbH of Kaiserslautern, Germany.

Harmonics of the 1064 nm laser can also be used to improve ablation for specific materials. For example, a wavelength of approximately 532 nm can be used to ablate Cu, a wavelength of approximately 355 nm can be used to ablate Si and certain low-k dielectrics, and a wavelength of approximately 266 nm can be used to ablate glass. In one embodiment, the wavelength is selected based at least in part on the respective materials and relative thicknesses of the layers 202, 204, 206 and/or the substrate 208 so as to increase cutting speed. For example, the wavelength may be optimized to ablate a thick Cu layer rather than a relatively thin dielectric layer. In an alternative embodiment, the wavelength may be changed between ablation of one or more of the layers 202, 204, 206, and/or the substrate 208. An artisan will also recognize that using the harmonics will also improve the ability to focus the laser beam because focusing is dependent on wavelength.

To scribe the layers 202, 204, 206, according to one embodiment, the fluence of each laser pulse is set at or above the highest ablation threshold in the stack of layers 202, 204, 206 for a given wavelength, pulse energy, and pulse duration. In one embodiment, the fluence of each laser pulse is set in a range between approximately one and ten times the highest ablation threshold in the stack. In another embodiment, the fluence of each laser pulse is set in a range between approximately one and five times the highest ablation threshold in the stack.

For example, it may be determined that the third layer 206 has a higher ablation threshold than the first and second layers 202, 204. Thus, using short pulses in the picosecond range, setting the fluence of the laser pulses so as to ablate the third layer 206 also provides ablation of the first and second layers 202, 204. In an exemplary embodiment, the fluence is set at approximately 1.5 times the highest ablation threshold in the stack. If, for example, the third layer 206 has an ablation threshold of approximately 10 J/cm$^2$ at a pulse width of approximately 10 picoseconds, the laser beam 216 is configured to generate approximately 20 μJ pulses with a spot size of approximately 10 μm to achieve a fluence in a range between approximately 15 μJ/cm$^2$ and approximately 20 μJ/cm$^2$.

An artisan will recognize that more layers or less layers may be ablated or partially ablated during the laser scribing process. For example, the laser beam 216 may be configured to ablate the top two layers 202, 204 without ablating the third layer 206. Alternatively, as illustrated in FIG. 2C, the laser beam 214 may be configured to cut through the layers 202, 204, 206 and the substrate 208 to fully separate the active device areas 210, 212 from one another (e.g., dicing). In certain embodiments, silicon substrates having a thickness in a range between approximately 10 μm and approximately 760 μm are throughcut using a laser cutting process. Artisans will recognize from the disclosure herein that other substrate thicknesses can also be throughcut according to the methods described herein.

However, as shown in FIGS. 2A and 2B, in one embodiment, the work piece 200 is scribed to remove at least a portion of the layers 202, 204, 206 in the street 214. The work piece 200 can then be mechanically broken or mechanically sawed along the kerf path 218 to complete the dicing process. Thus, materials that may be damaged by the saw and/or that can damage the saw, such as low-k dielectrics or test structures, can be removed before sawing. In one embodiment, the saw follows the kerf 218 so as to not touch the layers 202, 204, 206. Advantageously, cracking and debris are reduced, die break strength is increased and overall yield is improved.

Figure 3A:
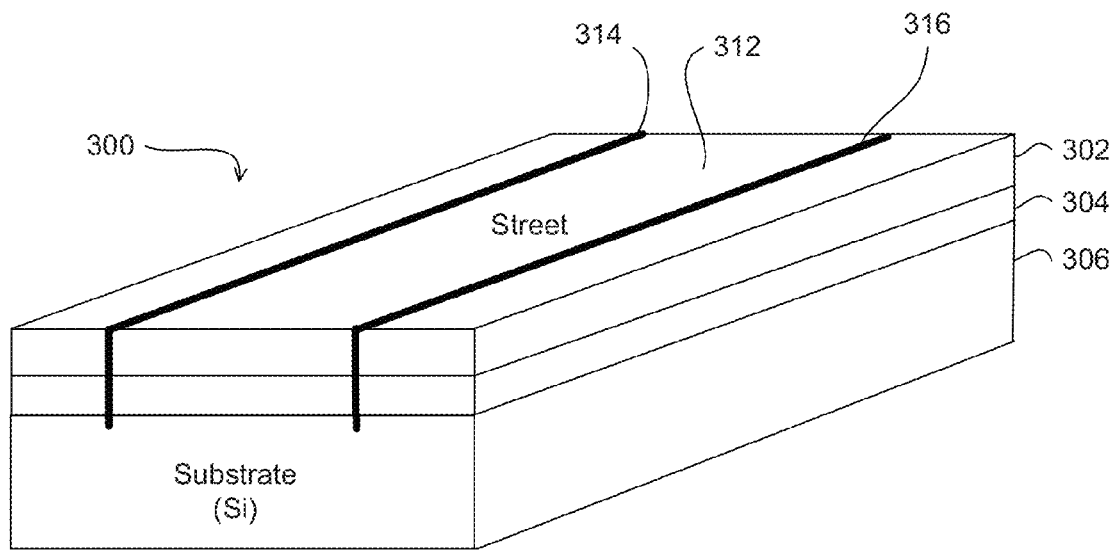
FIG. 3A is a perspective view of a work piece cut according to another embodiment of the invention.

FIG. 3A is a perspective view of a work piece 300 cut according to another embodiment of the invention. The work piece 300 includes layers 302, 304 formed over a substrate 306. As discussed above, the layers 302, 304 may include, for example, materials such as Cu, Al, SiO$_2$, SiN, fluorsilicated glass (FSG), organosilicated glass (OSG), SiOC, SiOCN, and other materials used in IC manufacture. The substrate 306 may include, for example, Si, FR4, glass, polymer, metal, composite material, and other materials used in IC manufacture.

Figure 3B:
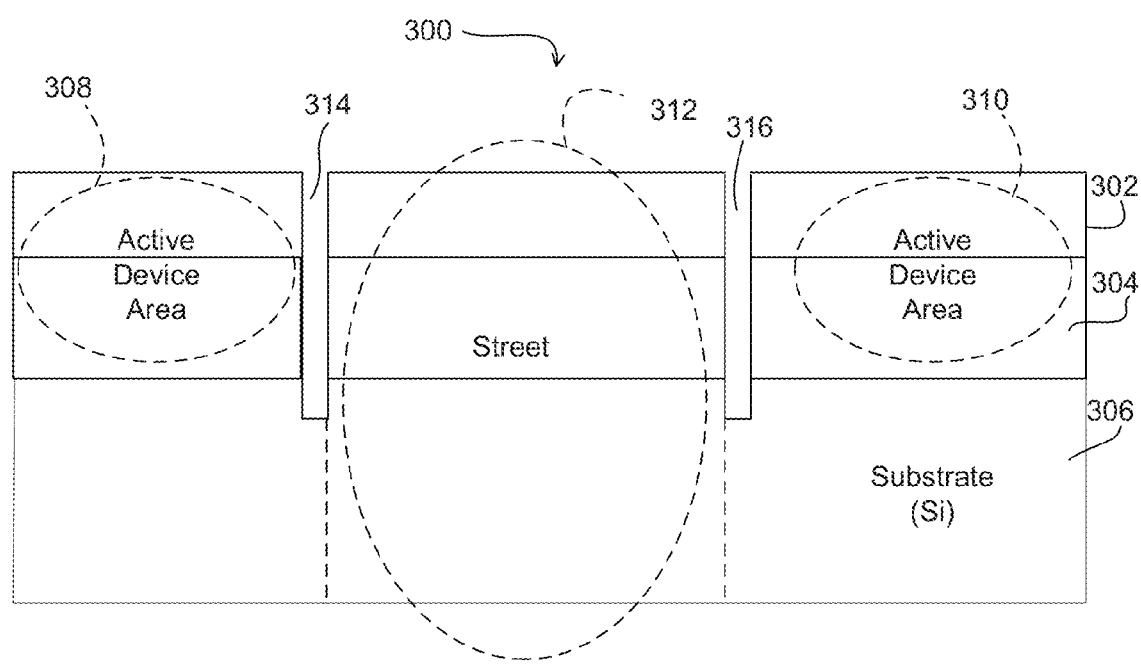
FIG. 3B is a side view schematic of the work piece shown in FIG. 3A.

FIG. 3B is a side view schematic of the work piece 300 shown in FIG. 3A. As shown, electronic circuitry is formed in active device areas 308, 310 that are separated from each other by a street 312. In this example, the work piece 300 is scribed such that laser kerfs 314, 316 are formed using laser parameters described herein on both sides of the street 312. In one embodiment, the laser kerfs 314, 316 are each in a range between approximately 5 μm and approximately 10 μm wide. As shown in FIGS. 3A and 3B, in certain embodiments, the laser kerfs 308, 310 extend into the substrate 306. However, in other embodiments, the laser kerfs 308, 310 remove material only in one or both of the layers 302, 304.

The laser scribes 314, 316 act as "crack stops" or physical barriers for heat and mechanical stress during further processing. Thus, the laser scribes 314, 316 provide mechanical separation and thermal separation between the street 312 and the active device areas 308, 310. For example, after creating the laser scribe lines 314, 316 using laser ablation techniques described herein, the street 312 can be mechanically sawed to dice the active device areas 308, 310. The harsh effects of sawing the street 312 do not propagate to the active device areas 308, 310 such that cracking and chipping associated with mechanical sawing is reduced or eliminated in these areas.

Figure 4:
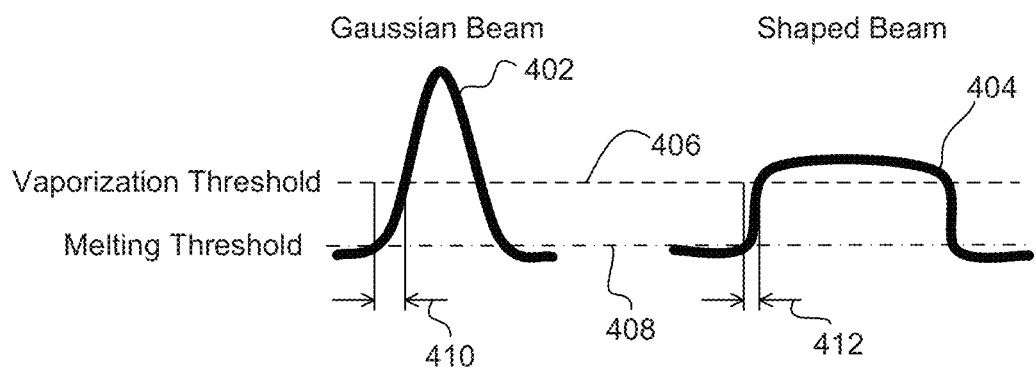
FIG. 4 graphically illustrates the difference between a simplified Gaussian beam irradiance profile and a simplified shaped beam irradiance profile.

As discussed above, in certain embodiments, the laser beam 216 shown in FIG. 2A is shaped so as to increase the quality of the kerf's sidewall profile and reduce or prevent damage to the substrate 208. FIG. 4 graphically illustrates the difference between a simplified Gaussian beam irradiance profile 402 and a simplified shaped beam irradiance profile 404. The center of the Gaussian beam irradiance profile 402 is much larger than the vaporization threshold 406 and the melting threshold 408 as compared to the shaped beam irradiance profile 404. Thus, the Gaussian beam puts a larger amount of excessive energy into the target material, especially at the center of the beam.

Further, the slope of the Gaussian beam irradiance profile 402 between the melting threshold 408 and the vaporization threshold is less than that of the shaped beam irradiance profile 404. Thus, the Gaussian beam will produce a wider recast oxide layer because a wider area of material will be melted but not vaporized. For example, the arrows 410 represent the width of the recast oxide layer produced by the Gaussian beam while the arrows 412 represent the width of the recast oxide layer produced by the shaped beam. Due to the rapid slope of the shaped beam irradiance profile 404 between the melting threshold 408 and the vaporization threshold 406, the shaped beam produces a narrower recast oxide layer.

Figure 5A:
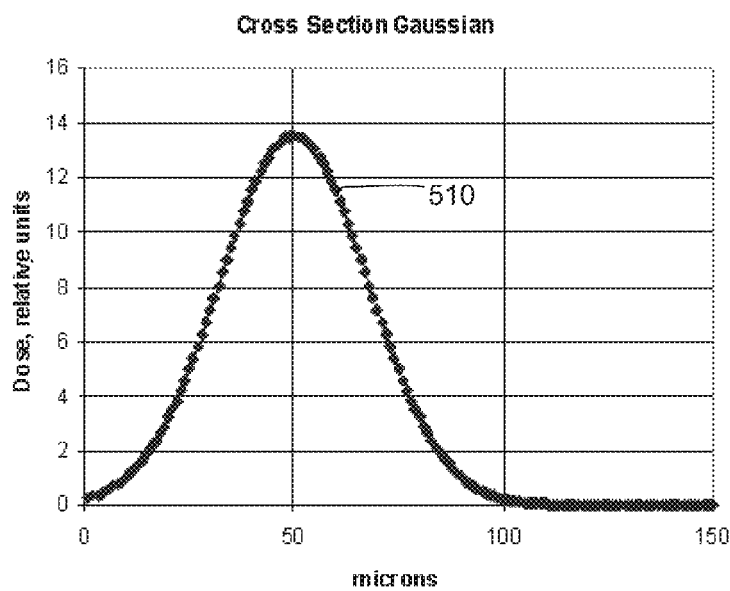
FIGS. 5A-5C graphically illustrate the difference between beam cross section profiles.
Figure 5B:
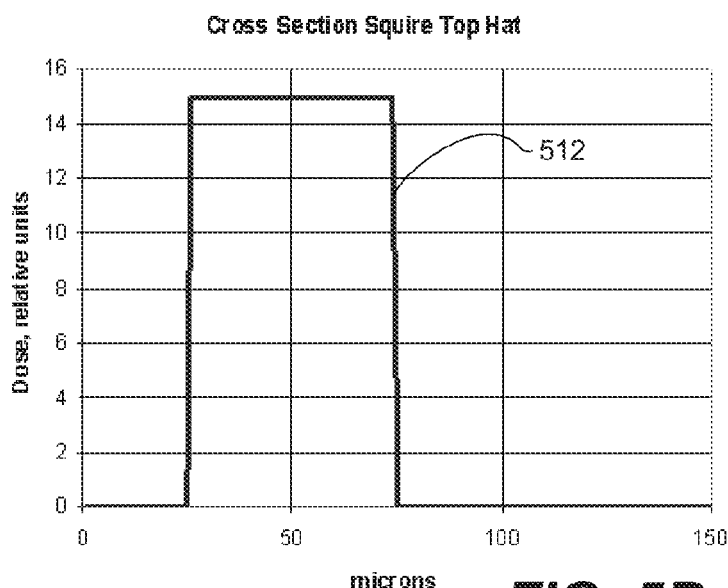
Figure 5C:
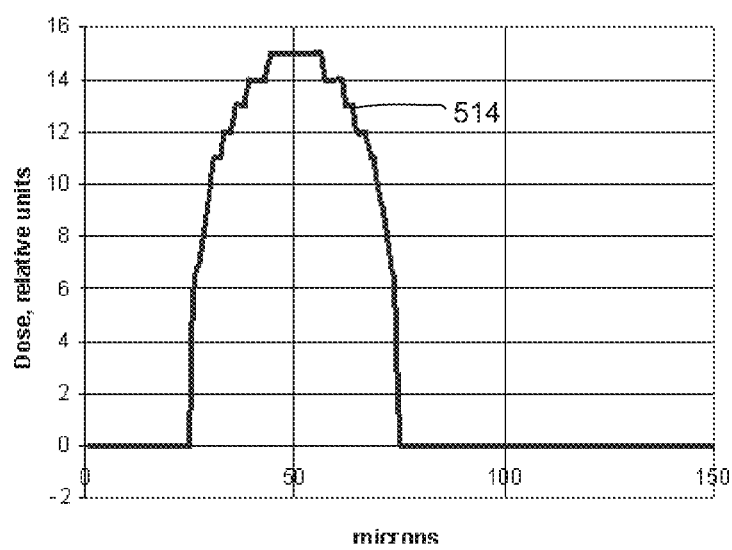

FIGS. 5A-5C graphically illustrate the difference between beam cross section profiles. FIG. 5A shows a Gaussian cross section profile 510. FIGS. 5B-5C show "top hat" shaped cross section profiles. FIG. 5B shows a square cross section profile 512 and FIG. 5C shows a round cross section profile 514.

Figure 6A:
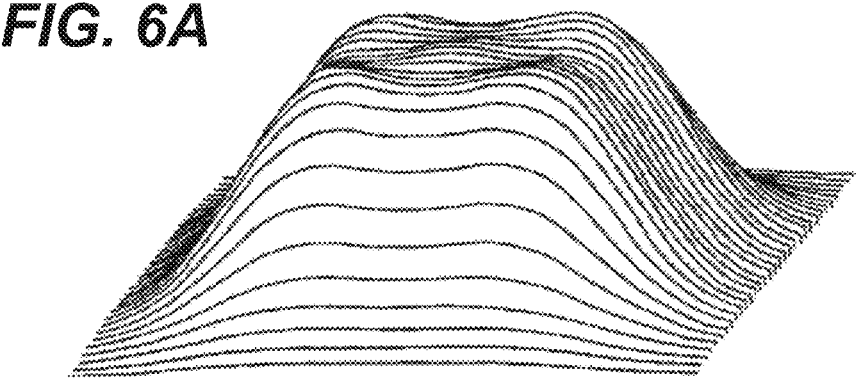
FIGS. 6A-6D show exemplary substantially uniform irradiance profiles produced by a Gaussian beam propagating through a diffractive optical element (DOE) according to certain embodiments of the invention.
Figure 6B:
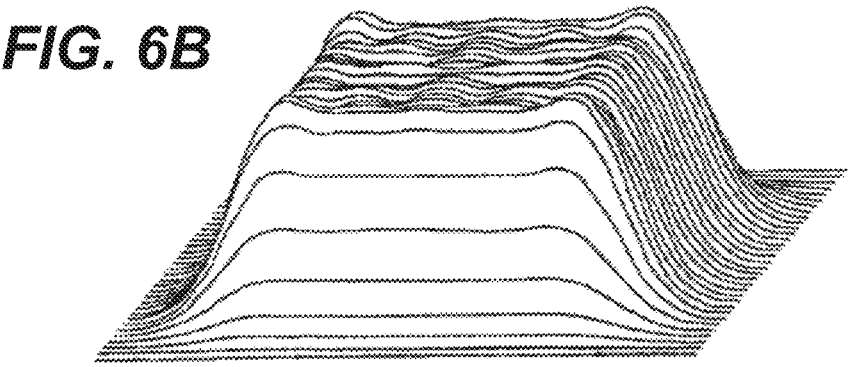
Figure 6C:
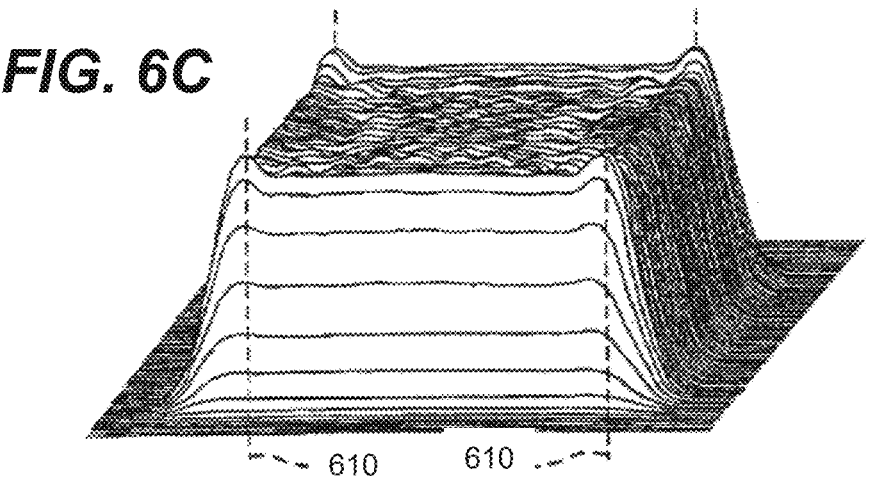
Figure 6D:
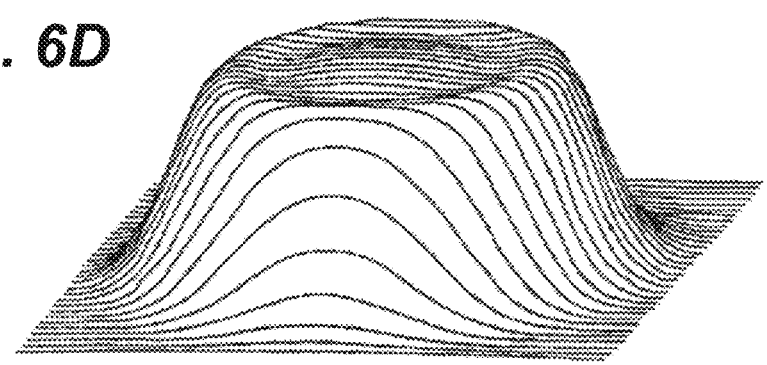

U.S. Pat. Nos. 6,433,301 and 6,791,060 to Dunsky et al. disclose systems and methods for beam shaping according to certain embodiments. FIGS. 6A-6D show exemplary substantially uniform irradiance profiles produced by a Gaussian beam propagating through a diffractive optical element (DOE) as described in U.S. Pat. No. 5,864,430. FIGS. 6A-6D show "top hat" shaped beams. FIGS. 6A-6C show square irradiance profiles, and FIG. 6D shows a cylindrical irradiance profile. The irradiance profile of FIG. 6C is "inverted," showing higher intensity at its edges than toward its center. Beam shaping components can be selected to produce pulses having an inverted irradiance profile shown in FIG. 6C that is clipped outside dashed lines 610 to facilitate ablation to further improve kerf taper. Artisans will appreciate that beam shaping components can be designed to supply a variety of other irradiance profiles that might be useful for specific applications.

Figure 7:
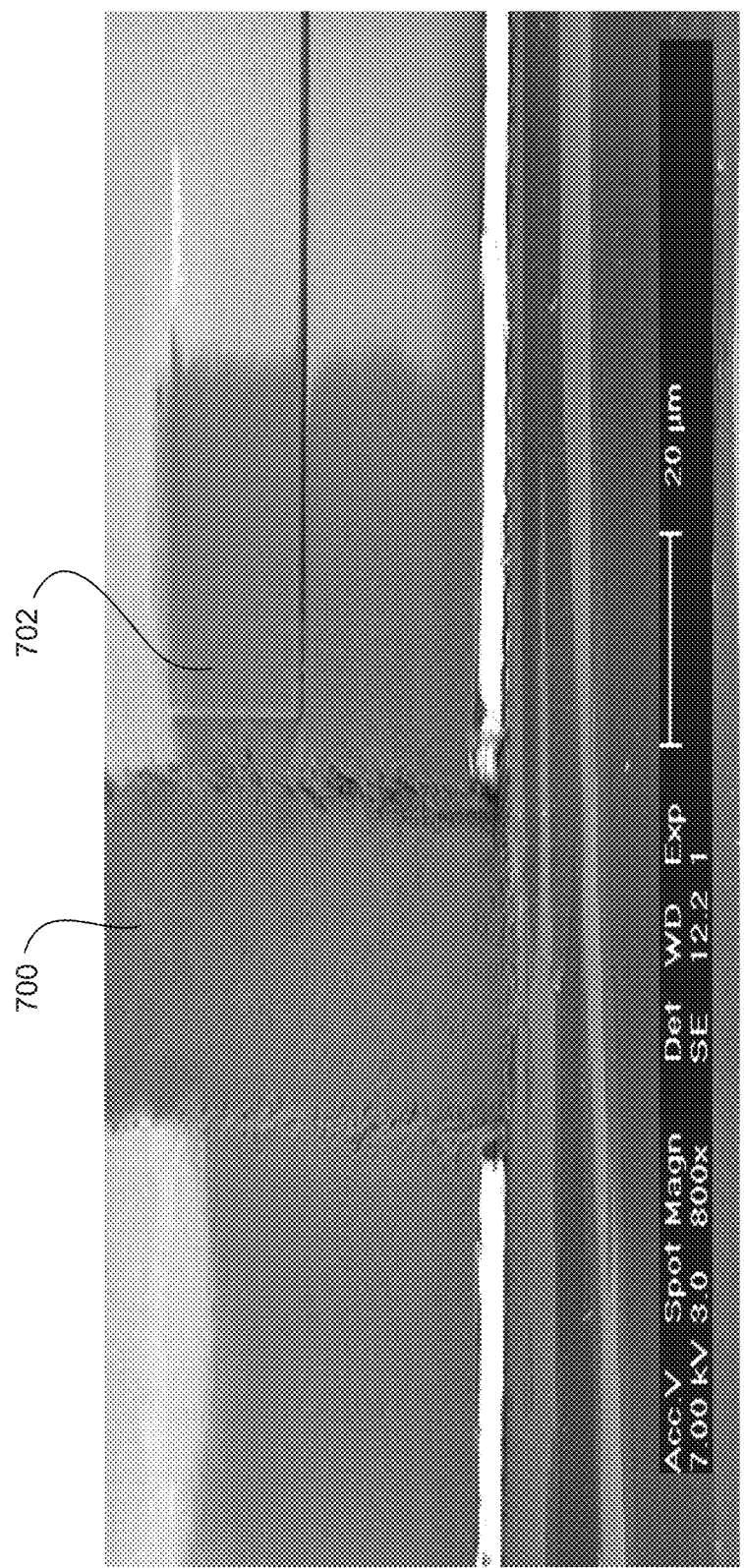
FIG. 7 is an electron micrograph of a kerf scribed through interconnect and low-k dielectric layers according to an embodiment of the invention.

FIG. 7 is an electron micrograph of a kerf 700 scribed through interconnect and low-k dielectric layers 702. The kerf 700 is approximately 35 μm wide and was scribed using a laser having a wavelength of approximately 355 nm. As described herein, a short pulse width (e.g., in the picosecond range) and a rapid pulse rate frequency were used to achieve low fluence ablation at high speeds. The kerf 700 was scribed at a speed of over 500 mm/s with a "top hat" shaped beam. The beam shaping provides a kerf bottom that is substantially flat and sides that are substantially vertical and well defined. Further, there is substantially no chipping or cracking.

In certain embodiments disclosed herein, scribing can be accomplished using a single laser pass. However, in certain other embodiments, the amount of material removed per pulse is not sufficient to achieve the desired scribe depth in one laser pass. In certain such embodiments, each location in the scribe line is exposed with multiple pulses to achieve desired material removal. In one such embodiment, material is exposed with pulses overlapping in the direction of a cut.

Figure 8:
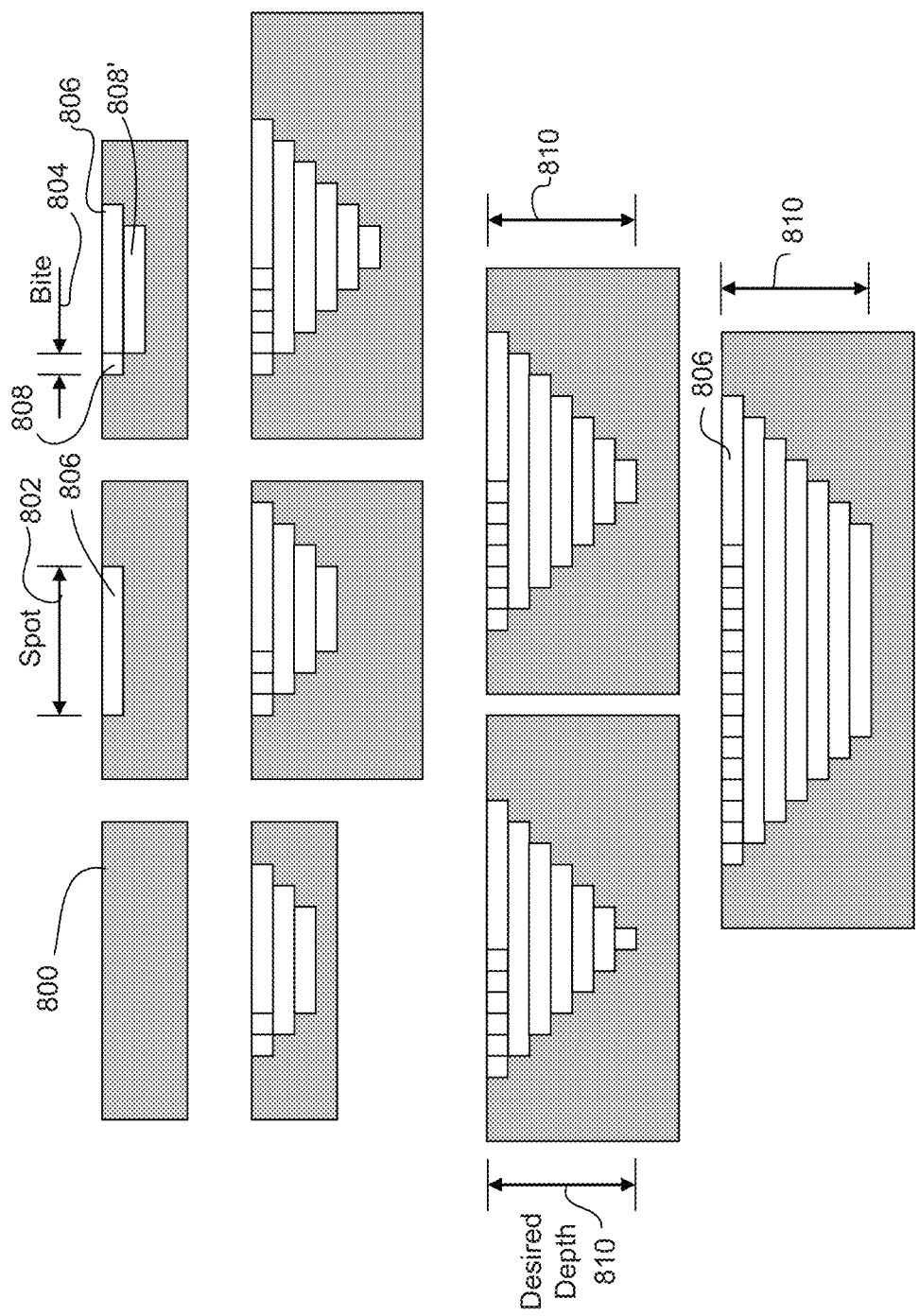
FIG. 8 schematically illustrates sequentially exposing a work piece to laser pulses in the direction of a cut according to an embodiment of the invention.

For example, FIG. 8 schematically illustrates sequentially exposing a work piece 800 to laser pulses in the direction of a cut. Each pulse ablates a certain spot size 802 to a pulse ablation depth. To achieve an overall ablation depth, sequential pulses have an overlap offset or bite size 804 in the direction of the cut. For example, a first pulse removes material in a first area 806. Then, a second pulse shifted in the direction of the cut (e.g., to the left in FIG. 8) removes additional material from a second area 808 and a third area 808'. The width of the second area 808 and the third area 808' (when combined) is the same as the width of the first area 806 (e.g., the spot size 802). The second area 808 is to the side of the first area 806 in the direction of the cut and has a width equal to the bite size 804. The third area 808' is below a portion of the first area 806. Thus, the overall ablation depth increases from the first pulse to the second pulse.

The scribing process continues as additional pulses are sequentially applied to the work piece 800 in the direction of the cut. The overall depth of the cut increases with each pulse until a desired depth 810 is reached. After the desired depth 810 is reached, additional pulses continue to remove material in the direction of the cut without increasing the overall depth past the desired depth 810. For a given spot size 802, the bite size 804 will define the desired depth 810. The desired depth 810 is equal to the pulse ablation depth of a single pulse multiplied by the ratio of the spot size 802 to the bite size 804. For the example shown in FIG. 8, the bite size 804 is approximately one-seventh the size of the spot size 802. Thus, the desired depth 810 is seven times the pulse ablation depth of a single pulse (and is first reached after seven pulses).

In one embodiment, the cut speed is controlled by first selecting the pulse duration as discussed above to reduce the threshold of ablation. Advantageously, in certain embodiments, a pulse width is selected that provides substantially the lowest ablation threshold for the target material or materials. Then, the spot size is selected to provide the desired fluence for a selected energy per pulse. Based on the single pulse ablation depth, the bite size is then selected to provide the overall ablation depth. As discussed above, the pulse repetition frequency is then selected to increase cut speed. In certain embodiments, lower pulse repetition frequencies (e.g., approximately 70 kHz) are used with high pulse energies (e.g., approximately 50 µJ to approximately 100 µJ) to ablate at a low fluence and a high speed by changing the aspect ratio of the laser spot from symmetrical (e.g., circular) to asymmetrical (e.g., elliptical or rectangular) so as to distribute the energy of the pulses in the direction of the cut. Thus, rather than focusing the energy on a small circular spot, an elliptical or rectangular spot spreads the energy of each pulse to lower the fluence while removing material in the direction of the cut. A shaped rectangular beam, for example, may be configured such that the longer dimension of the rectangle is in the direction of the cut.

Figure 9:
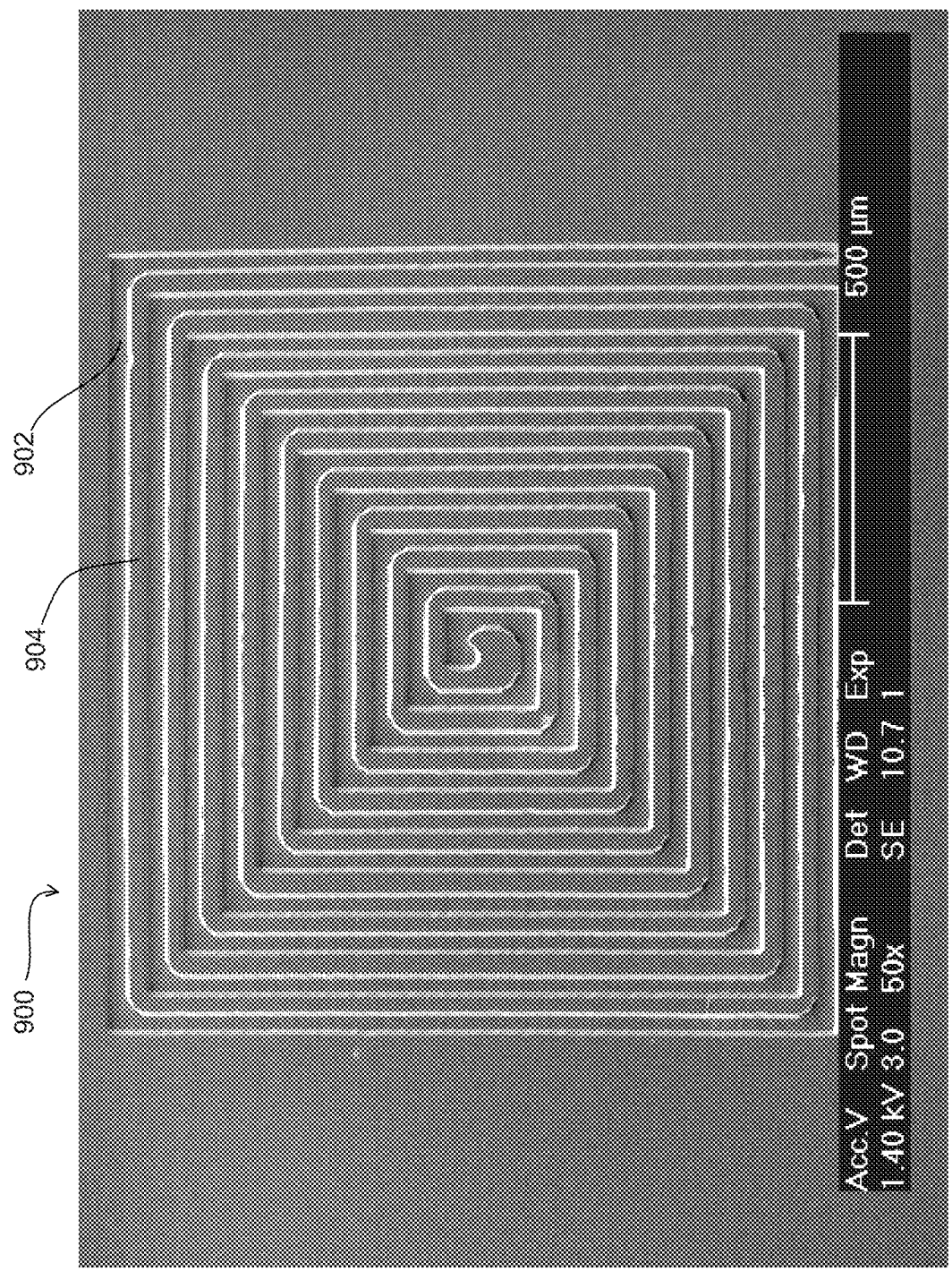
FIG. 9 is an electron micrograph of a micromachined pattern in a semiconductor material using laser ablation methods according to an embodiment of the invention.

Although the embodiments above have been described with respect to singulating semiconductor wafers, artisans will recognize other applications such as memory repair and laser micromachining. For example, FIG. 9 is an electron micrograph of a micromachined pattern 900 in a semiconductor material using the laser ablation methods described above. The exemplary pattern 900 includes trenches 902 approximately 51 µm wide cut in a precise pattern. The trenches 902 have substantially flat bottoms and well defined side walls. Further, the distance 904 between trenches is as small as approximately 25 µm.

Figure 10:
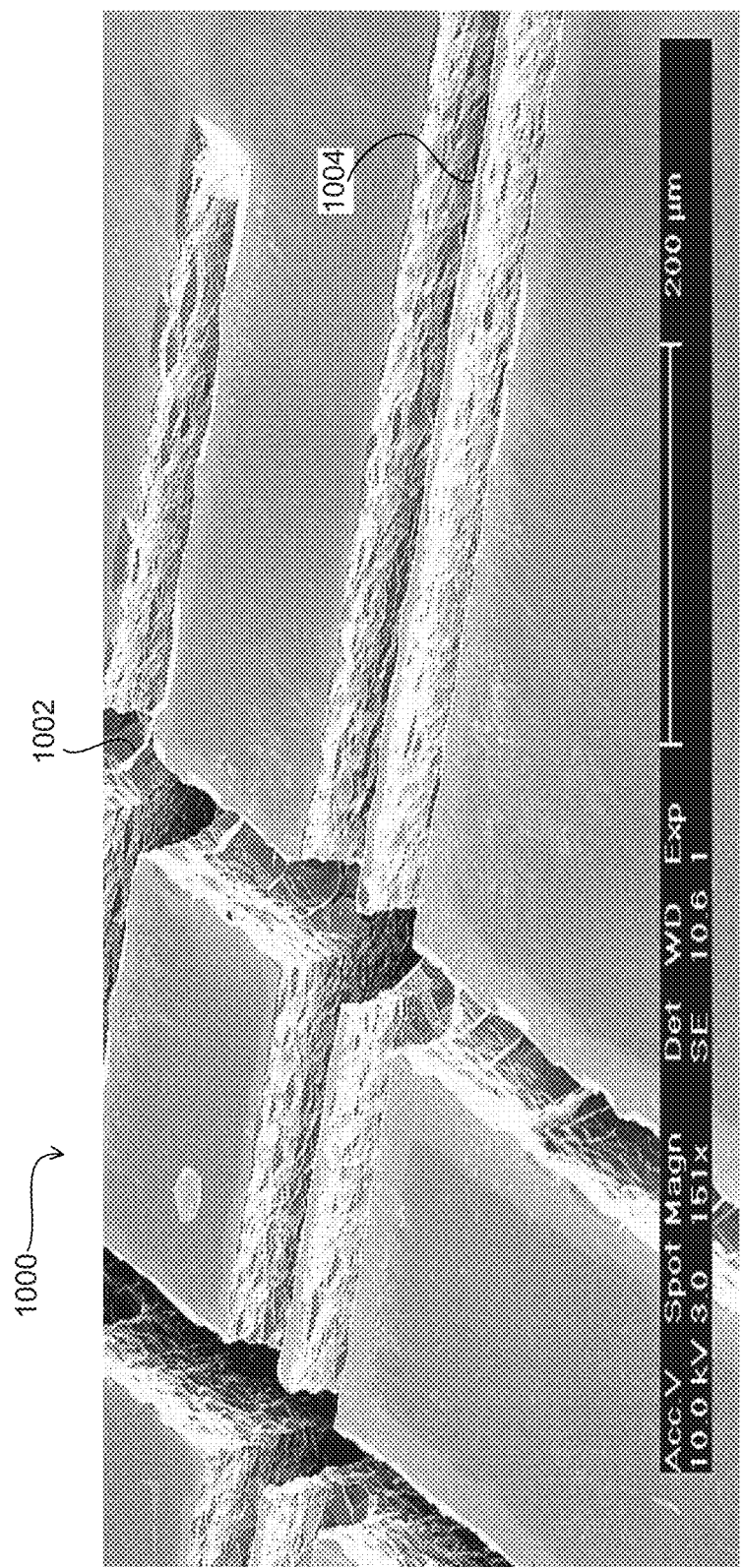
FIG. 10 is an electron micrograph of a micromachined pattern in a semiconductor material using laser ablation according to an embodiment of the invention.

Artisans will recognize from the disclosure herein that other patterns and more precise cuts can also be achieved. For example, FIG. 10 is an electron micrograph of a micromachined pattern 1000 in a semiconductor material using the laser ablation methods described above. The exemplary pattern 1000 includes trenches 1002 approximately 50 µm wide that are separated in some locations 1004 by distances approximately 10 µm wide.

In FIGS. 7, 8 and 9, it can be observed that there is substantially no chipping, cracking or contamination. In certain embodiments, some cleaning may be desired to remove small amounts of debris. For example, conventional high pressure water or solid $CO_2$ "sand blasting" techniques can be used after laser ablation to remove particles or debris. However, the ablation processes discussed herein are generally cleaner than conventional laser or mechanical saw cutting techniques and require less cleaning than conventional processes or no cleaning at all. Thus, additional lateral separation between devices on a wafer is not required to accommodate the dicing process. Further, due to the low fluence used with short wavelengths, there are less problems with heat affected zones, cracking, peeling, and chipping. Thus, higher die break strengths and overall process yields are achieved.

It will be obvious to those having skill in the art that many changes may be made to the details of the above-described embodiments without departing from the underlying principles of the invention. The scope of the present invention should, therefore, be determined only by the following claims.

What is claimed is:

1. A method of cutting a work piece including one or more layers formed over a substrate, the method comprising:
   generating a beam of laser pulses;
   shaping the generated beam of laser pulses only through diffraction to produce spatial irradiance profiles with flattened tops, wherein the shaping produces, at the work piece, a series of laser spots with edges that are flattened, each including an asymmetrical aspect ratio with a first dimension being longer than a second dimension, the shaping spatially spreading the energy of each of the laser pulses as the aspect ratios of the respective laser spots change from symmetrical to asymmetrical;
   aligning the longer first dimension of each laser spot in a cutting direction along the work piece so as to distribute the energy of each laser pulse in the cutting direction; and
   providing relative movement, in the cutting direction, between the beam and the work piece so as to scribe a kerf in the one or more layers, the kerf passing through the one or more layers to a top surface of the substrate.

2. The method of claim 1, wherein the laser pulses have a pulse width in a range between approximately 0.1 picosecond and approximately 1000 picoseconds.

3. The method of claim 1, wherein the beam has a pulse repetition rate in a range between approximately 100 kHz and approximately 100 MHz.

4. The method of claim 1, wherein the energy per pulse is in a range between approximately 1 µJ and approximately 100 µJ.

5. The method of claim 1, wherein the average power of the beam is approximately 10 Watts or more.

6. The method of claim 1, wherein the one or more layers have a combined thickness in a range between approximately 8 µm and approximately 12 µm, and wherein the beam is configured to scribe the kerf through the one or more layers at a rate in a range between approximately 200 mm/second and 1000 mm/second.

7. The method of claim 1, further comprising cutting the substrate with a saw along the length of the kerf.

8. The method of claim 1, wherein the kerf forms a first scribe line and a second scribe line separating a first active device area from a second active device area.

9. The method of claim 8, further comprising cutting the one or more layers and the substrate with a saw between the first scribe line and the second scribe line.

10. The method of claim 1, further comprising cutting with the beam through the one or more layers and the substrate in a single pass.

11. The method of claim 1, further comprising cutting with the beam through the one or more layers and the substrate in a plurality of passes.

12. The method of claim 1, wherein at least one of the one or more layers comprises a low-k dielectric material.

13. The method of claim 1, wherein the beam has a fluence in a range between the selected laser ablation threshold and approximately 5 times the selected laser ablation threshold.

14. A method of scribing a wafer having a plurality of integrated circuits formed thereon or therein, the integrated circuits separated by one or more streets, the method comprising:

generating a beam of laser pulses, the laser pulses having a pulse width selected so as to minimize an ablation threshold of a target material;

shaping the generated beam of laser pulses only through diffraction to convert the laser pulses into laser pulses with spatial irradiance profiles having flattened tops, wherein the shaping produces, at the wafer, a series of laser spots with edges that are flattened, each including an asymmetrical aspect ratio with a first dimension being longer than a second dimension, the shaping spatially spreading the energy of each of the laser pulses as the aspect ratios of the respective laser spots change from symmetrical to asymmetrical;

aligning the longer first dimension of each laser spot in a cutting direction along the wafer so as to distribute the energy of each laser pulse in the cutting direction; and providing relative movement, in the cutting direction, between the beam and the wafer so as to ablate a portion of the target material with the beam at a pulse repetition frequency in a range between approximately 5.1 MHz and approximately 100 MHz.

15. The method of claim 14, wherein the pulse width is in a range between approximately 0.1 picosecond and approximately 1000 picoseconds.

16. The method of claim 14, wherein the energy per pulse is in a range between approximately 1 µJ and approximately 100 µJ.

17. The method of claim 14, wherein the target material has a thickness in a range between approximately 8 µm and approximately 12 µm, and wherein the beam is configured to cut through the target material at a rate in a range between approximately 200 mm/second and 1000 mm/second.

18. A method of scribing a wafer having a plurality of integrated circuits formed thereon or therein, the integrated circuits separated by one or more streets, the method comprising:

generating a beam of one or more laser pulses, the laser pulses each having a pulse width in a range between approximately 0.6 picosecond and approximately 190 picoseconds;

shaping the generated beam of laser pulses only through diffraction to convert the laser pulses into laser pulses with spatial irradiance profiles with flattened tops, wherein the shaping produces, at the wafer, a series of laser spots with edges that are flattened, each including an asymmetrical aspect ratio with a first dimension being longer than a second dimension, the shaping spatially spreading the energy of each of the laser pulses as the aspect ratios of the respective laser spots change from symmetrical to asymmetrical;

aligning the longer first dimension of each laser spot in a cutting direction along the wafer so as to distribute the energy of each laser pulse in the cutting direction; and providing relative movement, in the cutting direction, between the beam and the wafer so as to ablate a portion of the target material with the beam.

19. The method of claim 18, wherein the beam has a pulse repetition frequency in a range between approximately 100 kHz and approximately 100 MHz.

* * * * *